United States Patent
Li et al.

(10) Patent No.: US 9,210,195 B2
(45) Date of Patent: Dec. 8, 2015

(54) METHOD, APPARATUS, AND SYSTEM FOR PROCESSING SERVICE DATA

(71) Applicant: HUAWEI TECHNOLOGIES CO., LTD., Shenzhen (CN)

(72) Inventors: Zijun Li, Shenzhen (CN); Zhandong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 13/686,278

(22) Filed: Nov. 27, 2012

(65) Prior Publication Data

US 2013/0103751 A1 Apr. 25, 2013

Related U.S. Application Data

(63) Continuation of application No. PCT/CN2012/075654, filed on May 17, 2012.

(30) Foreign Application Priority Data

Oct. 20, 2011 (CN) .......................... 2011 1 0321018

(51) Int. Cl.
*H04L 29/06* (2006.01)

(52) U.S. Cl.
CPC ..................................... *H04L 65/00* (2013.01)

(58) Field of Classification Search
CPC .................................. G06F 15/16; G06F 3/00
USPC ........................................................ 709/203
See application file for complete search history.

(56) References Cited

U.S. PATENT DOCUMENTS

| 2004/0215602 | A1* | 10/2004 | Cioccarelli | 707/3 |
| 2006/0031596 | A1 | 2/2006 | Blanchard et al. | |
| 2006/0209768 | A1* | 9/2006 | Yan et al. | 370/338 |
| 2006/0212535 | A1 | 9/2006 | Sutardja | |
| 2010/0042681 | A1 | 2/2010 | Jeon et al. | |
| 2011/0295972 | A1* | 12/2011 | Nagatomo | 709/217 |

FOREIGN PATENT DOCUMENTS

| CN | 1731378 A | 2/2006 |
| CN | 101600096 A | 12/2009 |
| CN | 102143207 A | 8/2011 |
| CN | 102387201 A | 3/2012 |

OTHER PUBLICATIONS

Chinese Office Action mailed Jun. 28, 2013 in corresponding Chinese Application No. 201110321018.8.
International Search Report of Corresponding PCT Application PCT/CN2012/075654 mailed Sep. 13, 2012.
Extended European Search Report issued on May 15, 2014 in corresponding European Patent Application No. 12 841 482.8.

* cited by examiner

*Primary Examiner* — Emmanuel L Moise
*Assistant Examiner* — Zia Khurshid
(74) *Attorney, Agent, or Firm* — Staas & Halsey LLP

(57) ABSTRACT

A method, an apparatus, and a system for processing service data are provided in embodiments of the present invention. The method mainly includes: receiving, by a network storage server, a service data request sent by a terminal of a user, and sending, by the network storage server, a network storage address or a local storage address corresponding to the service data to the terminal based on a network condition of the terminal and a storage condition of the service data on the network storage server and a local storage server. The embodiments of the present invention are capable of fully exerting the complementarity of the local storage server and the network storage server in terms of capacity, and flexibly selecting whether to provide a local storage service or a network storage service to the terminal of the user.

18 Claims, 4 Drawing Sheets

METHOD, APPARATUS, AND SYSTEM FOR PROCESSING SERVICE DATA

CROSS-REFERENCE TO RELATED APPLICATIONS

This application is a continuation of International Application No. PCT/CN2012/075654, filed on May 17, 2012, which claims priority to Chinese Patent Application No. 201110321018.8, filed on Oct. 20, 2011, both of which are hereby incorporated by reference in their entireties.

FIELD OF THE INVENTION

The present invention relates to the field of communications technologies, and in particular, to a method, an apparatus, a system for processing service data.

BACKGROUND OF THE INVENTION

As IT (Information Technology, information technology) technologies develop, people have higher and higher requirements on data storage, and data storage becomes increasingly important.

In the prior art, a first method for data storage is as follows: a user may store data in a hard disk of a local storage server, and the user may access the data stored in the hard disk by using any computer at home. The user may also use a network connection to access the data stored in the hard disk by means of secure web page access at any location.

The disadvantage of the first method for data storage in the prior art is as follows: in this method, data is stored only in the hard disk of the local storage server, a user may obtain the data only by using local and remote access to the hard disk, but the same data can not be copied automatically to remote network which located in the internet so that the user can access more expediently or more efficiently.

SUMMARY OF THE INVENTION

Embodiments of the present invention provide a method, an apparatus, and a system for processing data, thereby implementing flexible selection of whether to provide a local storage service or a network storage service to a terminal of a user.

A method for processing service data includes:
receiving, by a network storage server, a service data request sent by a terminal of a user; and
sending, by the network storage server, a network storage address or a local storage address corresponding to service data to the terminal based on a network condition of the terminal and a storage condition of the service data on the network storage server and a local storage server.

A network storage server includes:
a service data request receiving module, configured to receive a service data request sent by a terminal of a user; and
a data processing module, configured to send a network storage address or a local storage address corresponding to service data to the terminal based on a network condition of the terminal and a storage condition of the service data on the network storage server and a local storage server.

A local storage server includes:
a service data request receiving module, configured to receive a service data request sent by a network storage server; and
a data processing module, configured to send service data or a local storage address corresponding to the service data to the network storage server.

A system for processing service data includes: the network storage server and the local storage server.

It can be seen from the technical solutions according to the embodiments of the present invention that the embodiments of the present invention fully exert the complementarity of the local storage server and the network storage server in terms of capacity, and flexibly select whether to provide a local storage service or a network storage service to the terminal of the user.

BRIEF DESCRIPTION OF THE DRAWINGS

To better illustrate the present invention or technical solution by using the existing technologies, the drawings that need to be used in the present invention or the description of existing technologies are presented in embodiments of the present invention. It is understandable that the drawings merely provide several applications of the present invention. Those skilled in the art can obtain other drawings based on these drawings without innovative work.

DETAILED DESCRIPTION OF THE EMBODIMENTS

To make the objectives, technical solutions, and advantages the present invention more comprehensible, the following clearly and completely describes the technical solutions according to the embodiments of the present invention with reference to the accompanying drawings in the embodiments of the present invention. Apparently, the embodiments in the following description are merely a part of rather than all the embodiments of the present invention. All other embodiments obtained by persons of ordinary skill in the art based on the embodiments of the present invention without creative efforts shall fall within the protection scope of the present invention.

To make the embodiments of the present invention more comprehensible, further explanation and illustration are provided in the following with reference to the accompanying drawings and by using several specific embodiments as examples, and the embodiments are not intended to limit the embodiments of the present invention.

Embodiment 1

In this embodiment, service data of a user is stored separately on a local storage server of a LAN (Local Area Network) and on a network storage server of the Internet. With a video playback service being taken as an example, the service data may include: data of the video file, and a name, duration, content description, and URL (Uniform Resource Locator, uniform resource locator) of the video file, and so on. One or more local storage servers and network storage networks may exist. The network storage server may be a cloud storage server. The cloud storage server provides limited space (the mainstream capacity is about 50 GB) for each user, the lower accessing speed due to bandwidth restriction, and is traffic-consuming. In addition, the content is allowed to be accessed only after being uploaded from the local to the cloud storage.

The local network may be a LAN. This LAN connects local terminals, storage servers and so on in a wired or wireless mode, allowing terminals, storage servers, and so on to communicate each other. The LAN may be a network at the home or workplace of the user.

The service data may be uploaded to the local storage server and network storage server by using the terminal of the user or a terminal of another user.

The terminal of the user needs to register on the local storage server and network storage server with a user ID, a password at least. The local storage server and network storage server may allocate user information, such as a user name, password, and permission, to the terminal of the user. Information, such as IP address information of the network storage server, an IP address of the local storage server, a communications port of the local network, and a communication protocol, needs to be stored in the terminal of the user.

The terminal may be a PC (Personal Computer, personal computer), a mobile phone, or a tablet computer.

Figure 1:
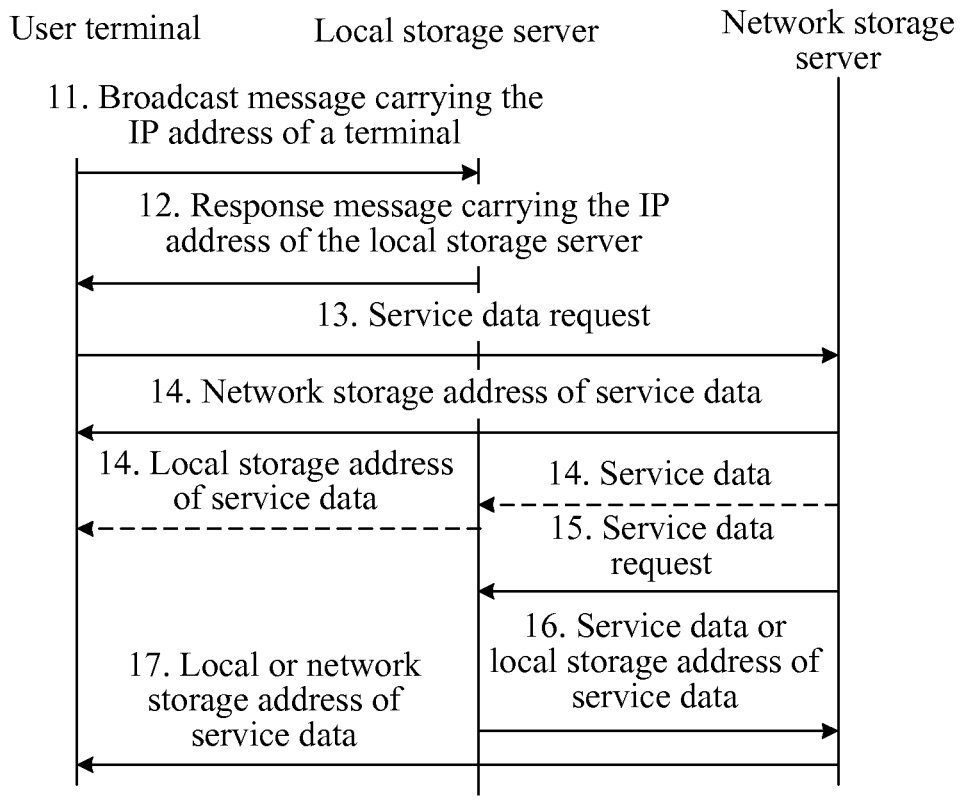
FIG. 1 is a processing flow chart of a method for processing service data when a terminal of a user is located on a local network according to a first embodiment of the present invention.

When the terminal of the user is located on the local network, a method for processing service data according to this embodiment, as shown in FIG. 1, includes the following processing steps:

Step 11: After the terminal of the user enables and starts a data function, the terminal of the user sends a broadcast message carrying an IP address of the terminal to the local network by using an agent.

The agent is a program that is located in the terminal and is configured to coordinate the processing between the terminal and the local storage server, and between the terminal and the network storage server, and provide support for users to use a specific service. The agent allows the terminal to register with and log in to the network storage server and the local storage server, send a broadcast message to the network, and so on.

The terminal first needs to register at least two pieces of information, including a user ID and a password, with the network storage server and the local storage server; or the user ID and password are automatically allocated by the network storage server or the local storage server, and the password can be changed after terminal login later.

The terminal may perform login after registration. The network storage server and the local storage server may allocate certain permission information, such as adding a piece of content, deleting a piece of content, and modifying a piece of content. The terminal may perform the logout operation in a login state.

Step 12: As the terminal of the user is located on the local network, the local storage server on the local network will receive the broadcast message. The local storage server sends a response message carrying the IP address of the local storage server to the terminal, and the terminal stores the IP address of the local storage server.

Step 13: The terminal uses a domain name or IP address information of the network storage server to send a service data request carrying the IP address of the local storage server to the network storage server over the Internet, for example, sending a video file playback request to the network storage server.

Step 14: In this embodiment, a local gateway connects the network storage server, the local storage server, and all devices on the local network, so that the network storage server, the local storage server, and all devices on the local network may communicate each other. The local gateway generally refers to a WiFi radio AP (Access Point, access point).

The local storage server and the network storage server may notify each other of the service data stored on them, so as to perform service data sharing or synchronization.

The network storage server judges whether the service data requested by the terminal is stored on the network storage server. If yes, a network storage address corresponding to the service data is sent to the terminal, where the storage address may be a URL corresponding to the service data, and the terminal obtains the service data at the network storage address; or the network storage server sends the service data to the local storage server, so that the local storage server, after storing the service data, sends a local storage address corresponding to the service data to the terminal. In this way, when the terminal of the user requests local access to the same data next time, the data is provided by the local storage server.

Otherwise, step 15 is performed.

Step 15: The network storage server sends the service data request to the local storage server over the Internet.

Step 16: After receiving the service data request, the local storage server sends the local storage address corresponding to the service data or sends the service data to the network storage server after determining that the service data is stored on the local storage server.

Step 17: After receiving the local storage address sent by the local storage server, the network storage server sends the local storage address to the terminal. The terminal obtains the service data at the local storage address.

Alternatively, after receiving the service data sent by the local storage server, the network storage server stores the service data, and sends the network storage address corresponding to the service data to the terminal. The terminal obtains the service data at the network storage address. In this way, when the terminal of the user requests local access to the same data next time, the data may be provided by the network storage server.

Embodiment 2

Figure 2:
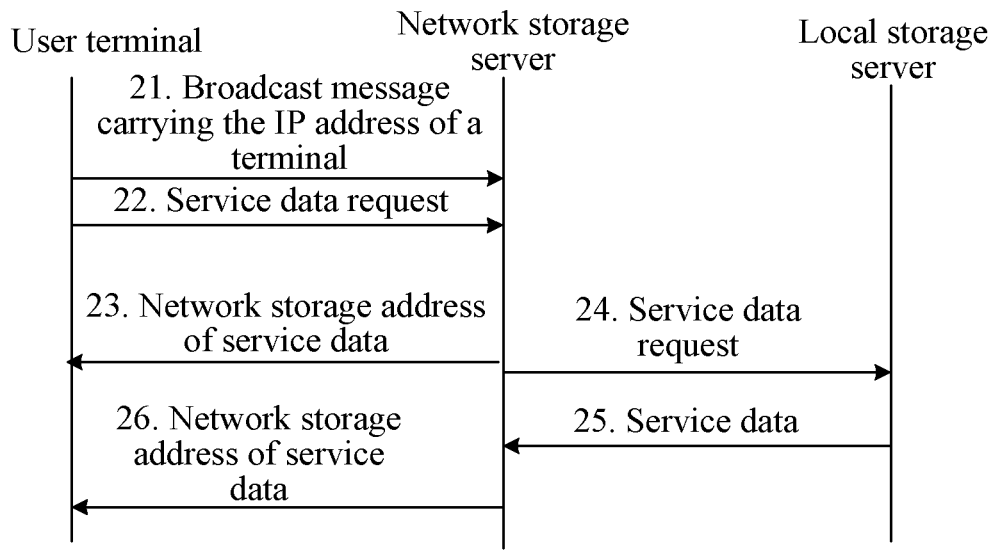
FIG. 2 is a processing flow chart of a method for processing service data when a terminal of a user is not on a local network according to a second embodiment of the present invention.

When a terminal of a user is not located on a local network, a procedure of a method for processing service data according to this embodiment, as shown in FIG. 2, includes the following processing steps:

Step 21: After the terminal of the user enables and starts a data function, the terminal of the user sends a broadcast message carrying an IP address of the terminal to the local network by using an agent.

The terminal of the user is not located on the local network, so a local storage server on the local network cannot receive the broadcast message. The terminal cannot receive a response message. Therefore, the terminal sets a flag indicating that it is not on the local network.

Step 22: The terminal uses a domain name or IP address information of the network storage server to send a service data request carrying the flag to the network storage server over the Internet, for example, sends a video file playback request to the network storage server.

Step 23: The network storage server judges whether the service data requested by the terminal is stored on the network storage server. If yes, a network storage address corresponding to the service data is sent to the terminal, and the terminal obtains the service data at the network storage address; and otherwise, step 24 is performed.

Step 24: The network storage server sends the service data request carrying the flag to the local storage server over the Internet.

Step 25: After receiving the service data request, the local storage server determines the terminal is not on the local network based on the flag after determining that the service data is locally stored in the local storage server, the local storage server sends the service data to the network storage server.

Step 26: After receiving the service data, the network storage server stores the service data, and sends a network storage address corresponding to the service data to the terminal. The terminal obtains the service data at the network storage address.

Embodiment 3

Figure 3:
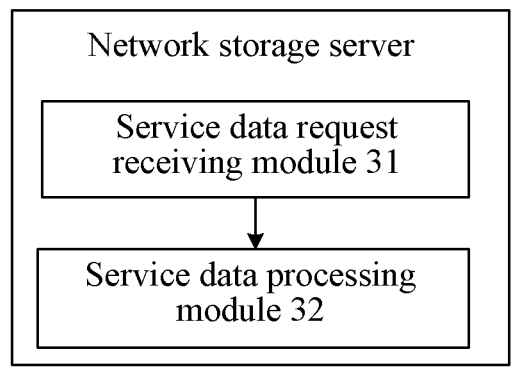
FIG. 3 is a specific structural diagram of a local storage server according to a third embodiment of the present invention.

This embodiment provides a network storage server, whose structure is shown in FIG. 3, including the following modules:

a service data request receiving module 31, configured to receive a service data request sent by a terminal of a user; and a data processing module 32, configured to send a network storage address or a local storage address corresponding to service data to the terminal based on a network condition of the terminal and a storage condition of the service data on the network storage server and a local storage server.

Specifically, the service data request receiving module 31 is further configured for the network storage server to receive, when the terminal is located on a local network, the service data request sent by the terminal by using the domain name or the IP address information of the network storage server over the Internet. The service data request carries the IP address of the local storage server on the local network where the terminal is located. The IP address of the local storage server is sent by the local storage server to the terminal after receiving a broadcast message sent by the terminal.

Specifically, the data processing module 32 is further configured to, when judging that the service data is stored on the network storage server, send the network storage address corresponding to the service data to the terminal; or send the service data to the local storage server, so that the local storage server sends the local storage address corresponding to the service data to the terminal after storing the service data;

or when judging that the service data is not stored on the network storage server, send the service data request to the local storage server, receive the service data sent by the local storage server, store the service data, and send the network storage address corresponding to the service data to the terminal; or receive the local storage address corresponding to the service data sent by the local storage server, and send the local storage address to the terminal.

Specifically, the service data request receiving module 31 is further configured to, when the terminal is not located on the local network, receive the service data request sent by the terminal by using the domain name or the IP address information of the network storage server over the Internet, where the service data request carries flag information indicating that the terminal is not on the local network.

Specifically, the data processing module 32 is further configured to, when judging that the service data is stored on the network storage server, send the network storage address corresponding to the service data to the terminal;

or when judging that the service data is not stored on the network storage server, send the service data request to the local storage server, receive the service data sent by the local storage server, store the service data, and send the network storage address corresponding to the service data to the terminal.

Figure 4:
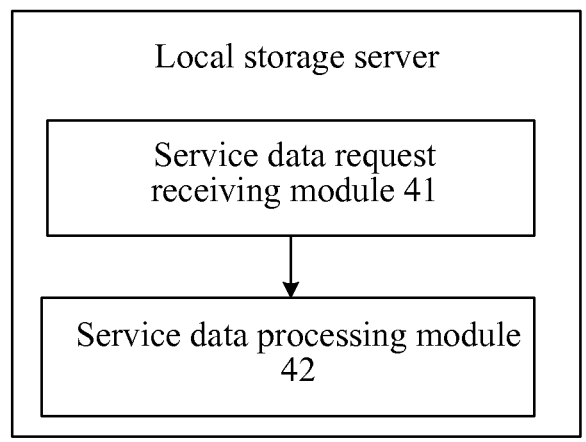
FIG. 4 is a specific structural diagram of a network storage server according to the third embodiment of the present invention.

This embodiment further provides the local storage server, whose structure is shown in FIG. 4, including the following modules:

a service data request receiving module 41, configured to receive the service data request sent by the network storage server; and a data processing module 42, configured to send the service data or the local storage address corresponding to the service data to the network storage server.

Specifically, the service data request receiving module 41 is further configured to, when the terminal is located on the local network, receive the broadcast message carrying the IP address of the terminal sent by the terminal to the local network, and send a response message carrying the IP address of the local storage server to the terminal.

Specifically, the data processing module 42 is further configured to, when the terminal is located on the local network, receive the service data sent by the network storage server, store the service data, and send the local storage address corresponding to the service data to the terminal.

The specific procedure for processing service data by using the apparatus in this embodiment is similar to that in the preceding method embodiment. The details will not be described herein again.

Embodiment 4

Figure 5:
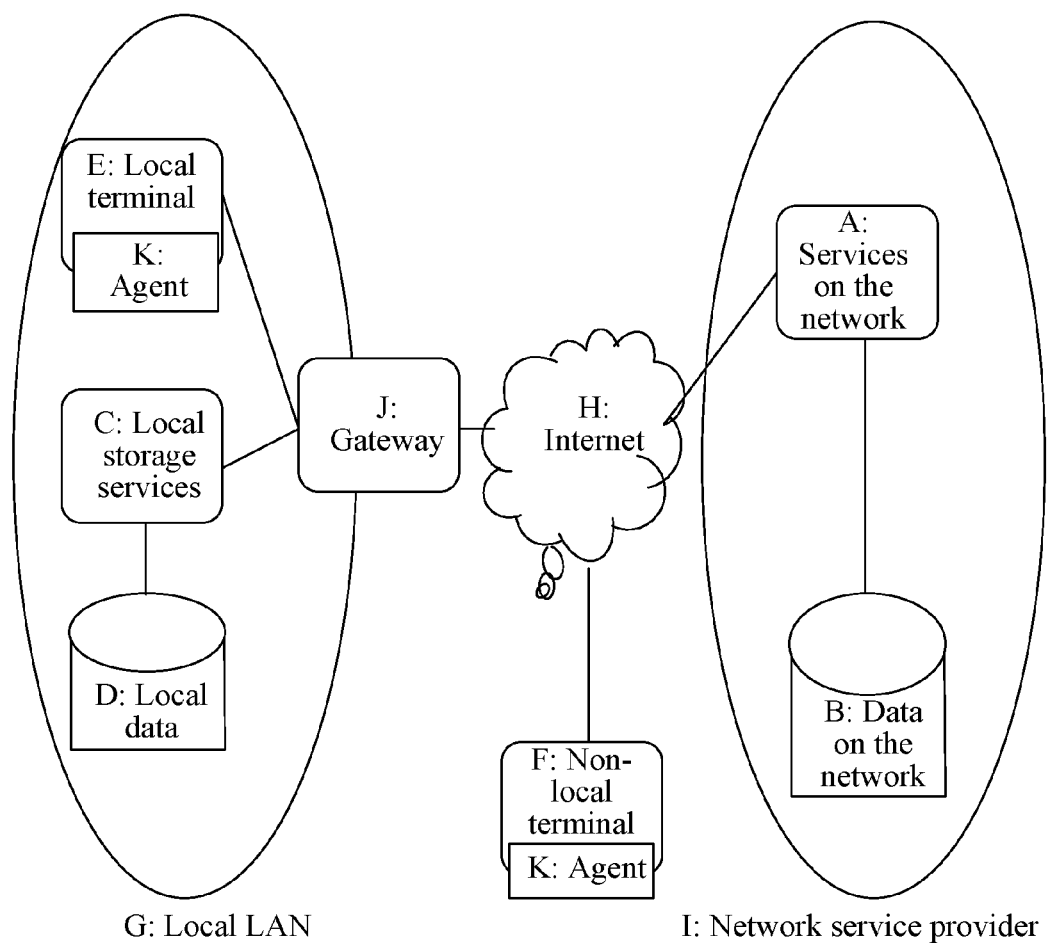
FIG. 5 is a specific principle implementation diagram of a system for processing service data according to the third embodiment of the present invention.

This embodiment further provides a system for processing service data, whose implementation principle is shown in FIG. 5. Services on the network in FIG. 5 refer to programs deployed by service providers on the Internet server. The terminal of the user uses these programs by connecting to the Internet. Data and description information of the data on the network refer to the data used by the preceding programs. The data and programs are stored on an Internet server. The Internet server may be a network storage server, and the programs may be video playback services. With a video file being taken as an example, the data includes the video file itself and description information, such as the video name, duration, content description, and storage location.

The local storage service show in FIG. 5 is a program installed on a local server. The program is responsible for managing local data. The service provides an interface for other programs to access local data. The local storage service provides other programs with access to local data and description information of the data.

A local terminal is a terminal of a user that is located on the same LAN as the local storage service and local data, such as a PC, a mobile phone, and a tablet computer. A local terminal may use services on the network by connecting to the Internet. The terminal may further use local services over a local network.

Non-local terminals refer to terminals that are not on the local network. These terminals have access only to an Internet H. They have same features with local terminals.

The LAN connects local machines (local terminals, local storage server, and so on) in a wired or wireless mode, allowing the machines to communicate each other. The LAN may be a network at the home or workplace of a user, and the user has an access permission.

The Internet connects the LAN, non-local terminals, and services of network service providers. A local gateway is responsible for connecting the LAN and the Internet, allowing machines on the LAN to access the Internet and these machines to communicate each other. The local gateway generally refers to a WiFi radio AP.

Network service providers deploy applications on networks and provide space for data storage, allowing users to use services and upload data.

The Agent (agent) is a program that is located in the terminal and is configured to coordinate common transactions between the terminal and the local storage server, and between the terminal and the network storage server, providing support for users to use a specific service. The agent allows the terminal to register with and log in to the network storage server and the local storage server, send a broadcast message to the network, and so on.

The terminal of the user may perform the login operation after registration with a local storage service. The terminal of the user may perform the logout operation in the login state.

After login to the local storage service, available user information may be updated, for example, available user information may be updated for the services on the network, and at least the following parameters are included: operation (adding a user and deleting a user), user ID, permission (adding a piece of content, deleting a piece of content, and modifying a piece of content), indicating to which uses the local service is open and which permission is open.

After login to the local storage service, description information about data content may be updated, and storage services may be provided for the services on the network, for example, locally available data may be updated for the services on the network, and at least the following parameters are included: operation (adding a piece of content, deleting a piece of content, and modifying a piece of content), and content description information.

Figure 6:
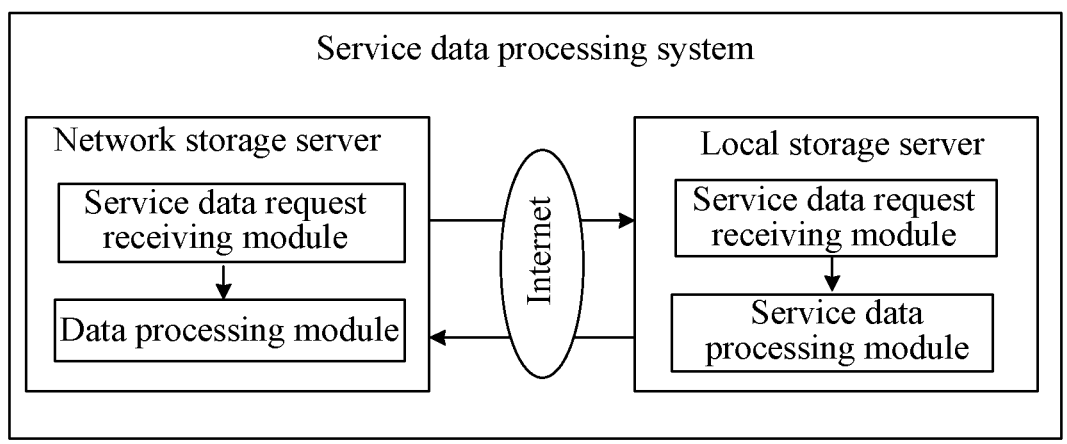
FIG. 6 is a specific structural diagram of the system for processing service data according to the third embodiment of the present invention.

The service processing system, whose structure is shown in FIG. 6, includes: a local storage server and a network storage server. The network storage server, whose structure is shown in FIG. 3, includes the following modules:

the service data request receiving module 31, configured to receive the service data request sent by the terminal of the user; and the data processing module 32, configured to send the network storage address or the local storage address corresponding to the service data to the terminal based on the network condition of the terminal and the storage condition of the service data on the network storage server and the local storage server.

Specifically, the service data request receiving module 31 is further configured for the network storage server to receive, when the terminal is located on the local network, the service data request sent by the terminal by using the domain name or the IP address information of the network storage server over the Internet. The service data request carries the IP address of the local storage server on the local network where the terminal is located. The IP address of the local storage server is sent by the local storage server to the terminal after receiving the broadcast message sent by the terminal.

Specifically, the data processing module 32 is further configured to, when judging that the service data is stored on the network storage server, send the network storage address corresponding to the service data to the terminal; or send the service data to the local storage server, so that the local storage server sends the local storage address corresponding to the service data to the terminal after storing the service data;

or when judging that the service data is not stored on the network storage server, send the service data request to the local storage server, receive the service data sent by the local storage server, store the service data, and send the network storage address corresponding to the service data to the terminal; or receive the local storage address corresponding to the service data sent by the local storage server, and send the local storage address to the terminal.

Specifically, the service data request receiving module 31 is further configured to, when the terminal is not located on the local network, receive the service data request sent by the terminal by using the domain name or the IP address information of the network storage server over the Internet, where the service data request carries the flag information indicating that the terminal is not on the local network.

Specifically, the data processing module 32 is further configured to, when judging that the service data is stored on the network storage server, send the network storage address corresponding to the service data to the terminal;

or when judging that the service data is not stored on the network storage server, send the service data request to the local storage server, receive the service data sent by the local storage server, store the service data, and send the network storage address corresponding to the service data to the terminal.

The local storage server, whose structure is shown in FIG. 4, includes the following modules:

the service data request receiving module 41, configured to receive the service data request sent by the network storage server; and the data processing module 42, configured to send the service data or the local storage address corresponding to the service data to the network storage server.

Specifically, the service data request receiving module 41 is further configured to, when the terminal is located on the local network, receive the broadcast message carrying the IP address of the terminal sent by the terminal to the local network, and send the response message carrying the IP address of the local storage server to the terminal.

Specifically, the data processing module 42 is further configured to, when the terminal is located on the local network, receive the service data sent by the network storage server, store the service data, and send the local storage address corresponding to the service data to the terminal.

The specific procedure for processing service data by using the system in this embodiment is similar to that in the method or apparatus embodiment. The details will not be described herein again.

Persons of ordinary skill in the art should understand that all or a part of the processes of the method in the embodiments may be implemented by a computer program instructing relevant hardware. The program may be stored in a computer readable storage medium. When the program is run, the processes of the method in the embodiments are performed. The storage medium may be a magnetic disk, an optical disk, a Read-Only Memory (Read-Only Memory, ROM), a Random Access Memory (Read-Only Memory, RAM), and the like.

In conclusion, the embodiments of the present invention fully exert the complementarity of the local storage server and the network storage server in terms of capacity, and flexibly select whether to provide a local storage service or a network storage service to the terminal of the user. Although the network storage capacity may be continuously expanded in the future, it is still difficult to provide large-capacity storage for each user in the case of a huge number of users. The local storage capacity, however, can easily reach 1T Bytes, which is 20 times of the average amount (50G Bytes) for each user on the network. This solution is capable of fully exerting the complementarity of access of local content and that of network content in terms of bandwidth.

If the terminal of the user connects to the LAN, and access data content over a nearby network, Internet traffic can be effectively reduced, the Internet bandwidth is not occupied, and the access speed (1000M bps) is far higher than the average speed of the Internet (100M bps). Especially in the case where multiple users access or one user makes multiple attempts to access the same piece of content locally, the preceding effect is much more significant.

The terminal of the user has a uniform entry point to the network service, and does not need to access local data and remote data by using different entry points.

The above descriptions are merely exemplary specific embodiments of the present invention, but the protection scope of the present invention is not limited hereto. Any changes or replacements that can be easily thought of by persons skilled in the art within the technical scope of the present invention should fall within the protection scope of the present invention. Therefore, the protection scope of the present invention is subject to the claims.

What is claimed is:

1. A method for processing service data, comprising:
   receiving, by a network storage server, a service data request sent by a terminal of a user; and
   sending, by the network storage server, a network storage address or a local storage address corresponding to service data to the terminal based on a network condition of the terminal and a storage condition of the service data on the network storage server and a local storage server, wherein the terminal is registered with the network storage server and the local storage server, wherein the receiving, by the network storage server, the service data request sent by the terminal of the user comprises:
   when the terminal is located on a local network, receiving, by the network storage server, the service data request sent by the terminal by using a domain name or IP address information of the network storage server over the Internet, wherein the service data request carries the IP address of the local storage server on the local network where the terminal is located, and the IP address of the local storage server is sent by the local storage server to the terminal after receiving a broadcast message sent by the terminal.

2. The method according to claim 1, wherein the sending, by the network storage server, the network storage address or the local storage address corresponding to the service data to the terminal based on the network condition of the terminal and the storage condition of the service data on the network storage server and the local storage server comprises:
   when the network storage server judges that the service data is stored on the network storage server, sending, by the network storage server, the network storage address corresponding to the service data to the terminal; or
   sending, by the network storage server, the server data to the local storage server, so that the local storage server sends the local storage address corresponding to the service data to the terminal after storing the service data.

3. The method according to claim 2, wherein the sending, by the network storage server, the service data request to the local storage server, and sending the network storage address or the local storage address corresponding to the service data to the terminal based on the information returned by the local storage server comprises:
   sending, by the network storage server, the service data request to the local storage server over the Internet, receiving the service data sent by the local storage server, storing the service data, and sending the network storage address corresponding to the service data to the terminal.

4. The method according to claim 1, wherein the sending, by the network storage server, the network storage address or the local storage address corresponding to the service data to the terminal based on the network condition of the terminal and the storage condition of the service data on the network storage server and the local storage server comprises:
   when the network storage server judges that the service data is not stored on the network storage server, sending, by the network storage server, the service data request to the local storage server, and sending the network storage address or the local storage address corresponding to the service data to the terminal based on information returned by the local storage server.

5. The method according to claim 4, wherein the sending, by the network storage server, the service data request to the local storage server, and sending the network storage address or the local storage address corresponding to the service data to the terminal based on the information returned by the local storage server comprises: sending, by the network storage server, the service data request to the local storage server over the Internet, receiving the local storage address corresponding to the service data sent by the local storage server, and sending the local storage address to the terminal.

6. The method according to claim 1, wherein the receiving, by the network storage server, the service data request sent by the terminal of the user comprises:
   when the terminal is not located on the local network, receiving, by the network storage server, the service data request sent by the terminal by using the domain name or IP address information of the network storage server over the Internet, wherein the service data request carries flag information indicating that the terminal is not on the local network.

7. The method according to claim 6, wherein the sending, by the network storage server, the network storage address or the local storage address corresponding to the service data to the terminal based on the network condition of the terminal and the storage condition of the service data on the network storage server and the local storage server comprises:
   when the network storage server judges that the service data is stored on the network storage server, sending, by the network storage server, the network storage address corresponding to the service data to the terminal.

8. The method according to claim 6, wherein the sending, by the network storage server, the network storage address or the local storage address corresponding to the service data to the terminal based on the network condition of the terminal and the storage condition of the service data on the network storage server and the local storage server comprises:
   when the network storage server judges that the service data is not stored on the network storage server, sending, by the network storage server, the service data request to the local storage server, receiving the service data sent by the local storage server, storing the service data, and sending the network storage address corresponding to the service data to the terminal.

9. The method according to claim 1, wherein the method further comprises:
connecting the network storage server, the local network storage server, and all devices on the local network by using a local gateway.

10. A network storage server, comprising a processor and a non-transitory processor-readable medium having processor-executable instructions stored thereon, the processor-executable instructions including a plurality of modules, the modules including:
a service data request receiving module, configured to receive a service data request sent by a terminal of a user; and
a data processing module, configured to send a network storage address or a local storage address corresponding to service data to the terminal based on a network condition of the terminal and a storage condition of the service data on the network storage server and a local storage server, wherein the terminal is registered with the network storage server and the local storage server, and wherein:
the service data request receiving module is further configured for the network storage server to receive, when the terminal is located on a local network, the service data request sent by the terminal by using the domain name or the IP address information of the network storage server over the Internet, wherein the service data request carries the IP address of the local storage server on the local network where the terminal is located, and the IP address of the local storage server is sent by the local storage server to the terminal upon receipt of a broadcast message sent by the terminal.

11. The network storage server according to claim 10, wherein:
the data processing module is further configured to, when judging that the service data is stored on the network storage server, send the network storage address corresponding to the service data to the terminal; or send the service data to the local storage server, so that the local storage server sends the local storage address corresponding to the service data to the terminal after storing the service data.

12. The network storage server according to claim 10, wherein:
the data processing module is further configured to, when judging that the service data is stored on the network storage server, send the network storage address corresponding to the service data to the terminal; or send the service data to the local storage server, so that the local storage server sends the local storage address corresponding to the service data to the terminal after storing the service data; when judging that the service data is not stored on the network storage server, send the service data request to the local storage server, receive the service data sent by the local storage server, store the service data, and send the network storage address corresponding to the service data to the terminal; or receive the local storage address corresponding to the service data sent by the local storage server, and send the local storage address to the terminal.

13. The network storage server according to claim 10, wherein:
the service data request receiving module is further configured to, when the terminal is not located on the local network, receive the service data request sent by the terminal by using the domain name or the IP address information of the network storage server over the Internet, and the service data request carries flag information indicating that the terminal is not on the local network.

14. The network storage server according to claim 13, wherein:
the data processing module is further configured to, when judging that the service data is stored on the network storage server, send the network storage address corresponding to the service data to the terminal.

15. A local storage server, comprising a processor and a non-transitory processor-readable medium having processor-executable instructions stored thereon, the processor-executable instructions including a plurality of modules, the modules including:
a service data request receiving module, configured to receive a service data request sent by a network storage server based upon a service data request received by the network storage server from a terminal registered with the network storage server and the local storage server; and
a data processing module, configured to send service data or a local storage address corresponding to the service data to the network storage server, wherein:
the service data request receiving module is further configured to, when a terminal is located on a local network, receive a broadcast message carrying the IP address of the terminal sent by the terminal to the local network, and send a response message carrying the IP address of the local storage server to the terminal.

16. The local storage server according to claim 15, wherein:
the data processing module is further configured to, when a terminal is located on a local network, receive the service data sent by the network storage server, store the service data, and send the local storage address corresponding to the service data to the terminal.

17. A service data processing system, comprising:
a local storage server; and
a network storage server configured to receive a service data request sent by a terminal of a user, and to send a network storage address or a local storage address corresponding to service data to the terminal based on a network condition of the terminal and a storage condition of the service data on the network storage server and the local storage server, wherein the local storage server is configured to receive a service data request sent by the network storage server, and to send service data or a local storage address corresponding to the service data to the network storage server, wherein the terminal is registered with the local storage server and the network storage server, and wherein:
the network storage server is further configured to receive, when the terminal is located on a local network, the service data request sent by the terminal by using the domain name or the IP address information of the network storage server over the Internet, wherein the service data request carries the IP address of the local storage server on the local network where the terminal is located, and the IP address of the local storage server is sent by the local storage server to the terminal upon receipt of a broadcast message sent by the terminal.

18. The network storage server according to claim 13, wherein:
when judging that the service data is not stored on the network storage server, send the service data request to the local storage server, receive the service data sent by the local storage server, store the service data, and send the network storage address corresponding to the service data to the terminal.

* * * * *